United States Patent [19]
Dach et al.

[11] 3,747,727
[45] July 24, 1973

[54] MULTIPLE COUPLING FOR PLANETARY-GEAR TRAINS

[75] Inventors: Hans Jörg Dach; Karl Heinz Bordowsky; Manfred Bucksch, all of Friedrichshafen, Germany

[73] Assignee: ZF Getriebe Gesellschaft mit beschrankter Haftung, Saarbrucken, Industriegebiet, Sud, Germany

[22] Filed: May 15, 1972

[21] Appl. No.: 253,440

[30] Foreign Application Priority Data
May 25, 1971 Germany................... P 21 25 850.4

[52] U.S. Cl............... 192/18 A, 192/87.11, 92/130, 192/70.2, 138/115
[51] Int. Cl............................................. F16d 67/04
[58] Field of Search............ 192/13 R, 18 A, 87.11, 192/87.12, 87.15

[56] References Cited
UNITED STATES PATENTS
| | | | |
|---|---|---|---|
| 3,069,929 | 12/1962 | Hansen............................ | 192/18 A |
| 3,088,552 | 5/1963 | Christenson et al.............. | 192/18 A |
| 3,554,057 | 1/1971 | Michnny et al................... | 192/87.11 |

*Primary Examiner*—Benjamin W. Wyche
*Attorney*—Karl F. Ross et al.

[57] ABSTRACT

A multiple coupling for individually or jointly driving two nested tubular power shafts of a planetary-gear train includes three coaxial sleeves spacedly centered on a drive shaft within a surrounding housing, the two nested power shafts being supported by a free end of the drive shaft and being respectively rigid with the inner and the outer sleeve while the intermediate sleeve is secured to the drive shaft for rotary entrainment thereby. The connection between the drive shaft and the intermediate sleeve is formed as a first fluid cylinder whose piston controls a set of interleaved inner and outer friction foils of a first clutch carried on the inner and intermediate sleeves; similarly, the connection between the outer sleeve and the outer tubular shaft is formed by a second fluid cylinder whose piston controls a set of interleaved inner and outer friction foils of a second clutch carried on the intermediate and outer sleeves. A further set of such coacting friction foils are mounted on the outer sleeve and the housing to act as a brake under the control of a further piston accommodated in a cylinder chamber of the housing. The sleeves have crenelated peripheries forming inner and outer guide ribs and grooves for the clutch and brake foils mounted thereon. Pressure fluid is admitted to the first fluid cylinder directly from the housing and to the second fluid cylinder through an axial bore in the drive shaft which is longitudinally partitioned by an insert into two mutually isolated channels for the pressure fluid and for lubricant, respectively.

12 Claims, 3 Drawing Figures

MULTIPLE COUPLING FOR PLANETARY-GEAR TRAINS

Our present invention relates to a multiple coupling, comprising two clutches and one brake, forming part of a power train including a set of planetary gears as used, for instance, in automotive transmissions.

In U.S. Pat. Nos. 3,580,109, 3,592,082, 3,593,599 and 3,600,975, for example, there have been disclosed a variety of planetary-gear trains with a pair of coaxial power shafts connected with different elements thereof, e.g. with a pair of sun gears, a sun gear and a ring gear, or a sun gear and a planet carrier. With the aid of fluid-operated (hydraulic or pneumatic) clutches and brakes, which may be collectively referred to as drive-establishing means, either or both of these power shafts may be selectively connected with a common drive shaft in certain modes of operation; in another mode, one of these power shafts may be immobilized. to The physical realization of such selectively operable multiple couplings has heretofore led to relatively bulky structures, especially if high operating pressures and therefore large effective piston surfaces for the clutch and brake members were required, and has also involved rather complicated machining of the parts.

The general object of our invention, therefore, is to provide an improved coupling of the type referred to which is of simplified construction and can be conveniently assembled and disassembled.

A related object is to provide such a multiple coupling in which individual components, especially the frictionally interengaging brake and clutch members, are readily accessible for replacement in case of wear or to fit different operating conditions such as increased or reduced loads.

These objects are realized, in accordance with our present invention, by a mounting of the clutch and brake members in nested relationship on three coaxial sleeves centered on the drive shaft within a surrounding housing, the coacting friction members of the first clutch being mounted on the inner and intermediate sleeves while the corresponding members of the second clutch are carried on the intermediate and outer sleeves; the friction members of the brake are supported by the outer sleeve and the surrounding housing. A first fluid cylinder, rigid with the drive shaft, is secured to the intermediate sleeve so that the latter rotates with that shaft; the inner sleeve has a tubular extension, coaxial with and preferably supported on the drive shaft though independently rotatable with reference thereto, which is connected with one of the power shafts of the associated planetary gearing, the other power shaft of that gearing being joined with the outer sleeve through the intermediary of a tubular extension of a second fluid cylinder rigid with that sleeve. The two fluid cylinders, confronting the two clutch assemblies from opposite sides, accommodate respective first and second pistons which are axially displaceable under fluid pressure to drive the friction members of the corresponding clutches against respective stops remote from these cylinders; in this manner, pressurization of the first piston couples the inner sleeve and therefore the inner one of the two nested power shafts with the drive shaft for entrainment thereby whereas pressurization of the second piston has the same effect with reference to the outer sleeve and therefore to the outer one of the power shafts. Upon simultaneous actuation of both clutches, the two power shafts are rotated jointly with the drive shaft to lock the planetary gearing for direct drive ("third gear"). A third cylinder, formed by the housing, is occupied by a third piston which confronts the brake assembly and can be operated to arrest the outer sleeve and therefore the outer power shaft. In an advantageous embodiment, this third cylinder is jointly defined by a cylindrical shell forming part of the housing and by an adjoining end wall, e.g. a removable lid, which has an annular shoulder forming an inner wall surface for the guidance of the annular piston body.

In a preferred embodiment, the same end wall also accommodates part of the conduit system through which pressure fluid such as hydraulic oil is supplied to the two clutch-actuating pistons. In the case of the piston remote from this wall, specifically the aforementioned second piston controlling the outer one of the two clutches, the supply conduit may pass from that end wall through a central bore of the drive shaft; in accordance with a further feature of our invention, this central bore is longitudinally partitioned into a first channel for the pressure fluid and a second channel for a lubricant which may be distributed by the rotating drive shaft from an oil sump inside the tubular extension of the inner sleeve, proximal to the shaft extremity supporting that extension, to other parts of the assembly including the shaft bearings and the sleeve mountings.

According to a further feature of our invention, the sleeves have crenellated peripheries which form inner and outer guide ribs and grooves for the annular friction members respectively supported thereby, these members being generally in the form of a multiplicity of interleaved foils even though in an extreme case they could also be constituted by a single pair of axially shiftable rings of substantial thickness. The crenellations of the inner sleeve are advantageously utilized for detachably linking it with its tubular extension to which it may be removably locked by a suitable detent such as, for example, a snap ring.

The above and other features of our invention will be described in detail hereinafter with reference to the accompanying drawing in which:

FIG. 3 is a cross-sectional detail view taken on the line III—III of FIG. 1.

Figure 1:
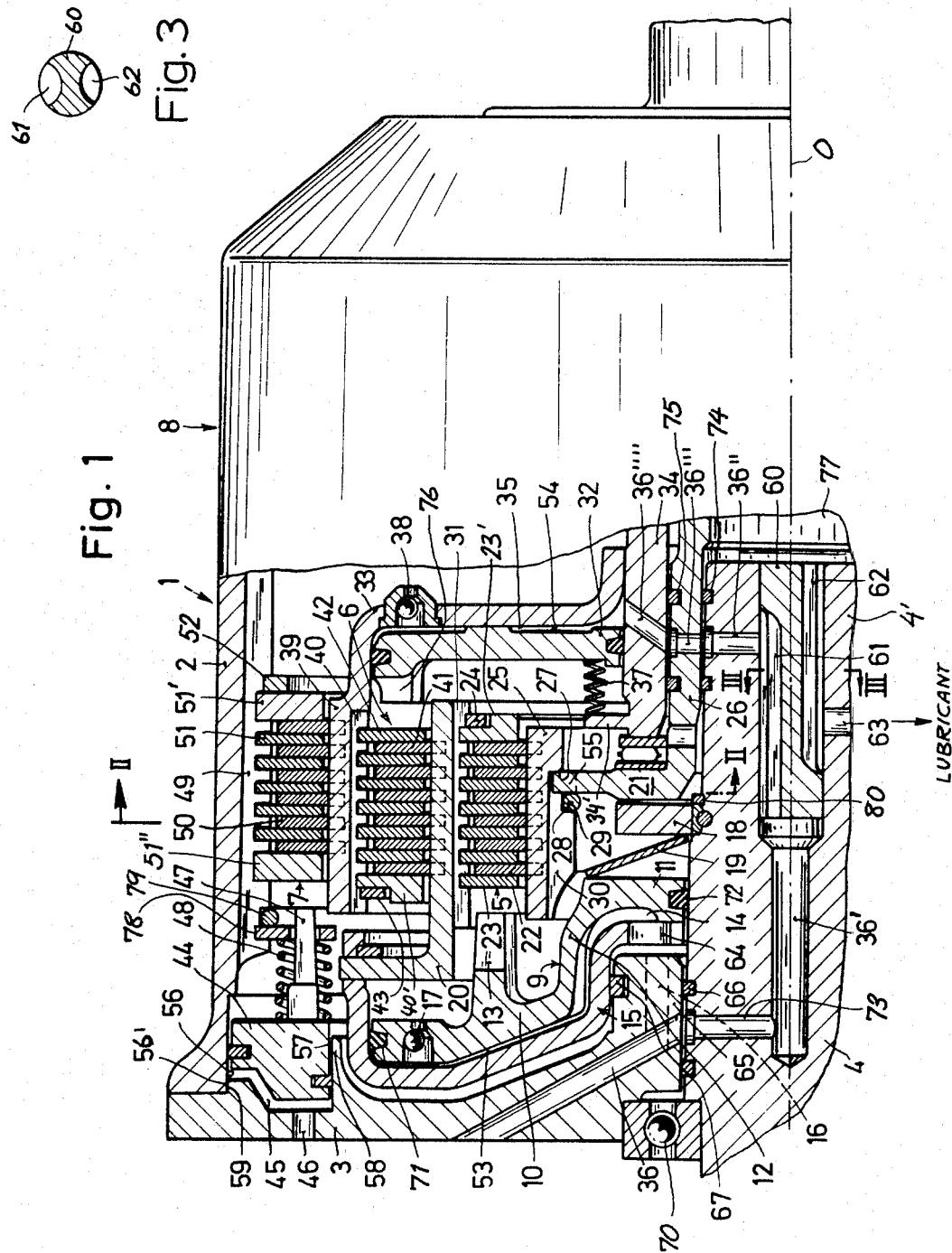
FIG. 1 is a side-elevational view, partly in section, of the greater portion of a cylindrical transmission unit including a planetary-gear train and an associated coupling embodying our invention.
Figure 2:
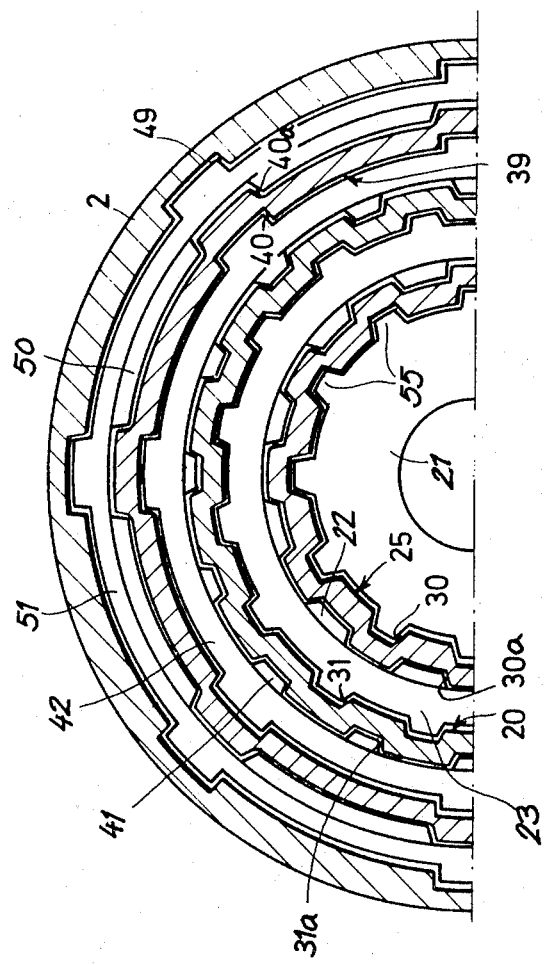
FIG. 2 is a fragmentary cross-sectional view taken on the line II-II of FIG. 1.

In FIG. 1 we have shown the upper half of a generally cylindrical unit 1 centered on an axis 0, this unit including a planetary-gear train 8 of conventional construction according to any of the above-identified prior patents. This gear train is provided with two coaxial power shafts, such as the ones designated I and II in these prior patents, which are integral with a pair of coaxial tubes 26 and 34, respectively. The unit includes a drive shaft 4 rotatably journaled, at 70, in a housing which comprises a cylindrical shell 2 and a lid 3 forming a detachable end wall. Three fluid-actuated coupling devices including a first clutch 5, a second clutch 6 and a brake 7 coaxially surround the shaft 4 in nested relationship. Clutch 5 comprises a set of interleaved annular foils 22, 23, the foils 22 being axially slidable on an inner sleeve 25 whereas foils 23 are similarly mounted on an intermediate sleeve 20. Clutch 6 is analogously constructed from a stack of interleaved foils 41 on sleeve 20 and foils 42 on an outer sleeve 39. Corresponding foils 50 and 51 of brake 7 are axially guided on sleeve 39 and housing shell 2, respectively. These foils, consisting of suitable friction material as is well known *per se*, normally are slightly separated from one another so as to permit unhindered relative rotation of sleeves 25, 20 and 39. The sleeves, as best seen in FIG. 2, have crenellated peripheries so as to form inner ribs 30 and outer ribs 30a in the case of sleeve 25, inner ribs 31 and outer ribs 31a in the case of sleeve 20, and inner ribs 40 and outer ribs 40a in the case of sleeve 39; corresponding ribs 49 are also formed on the inner periphery of shell 2. These ribs, and the intervening grooves, mate with notches and teeth in the adjoining edges of the associated annular foils 22, 23, 41, 42, 50 and 51. Stepped end rings 23', 40' and 51' bear upon respective annular stops constituted by snap rings 24,43 and 52. Brake 7 also includes a second end ring 51'' slidable along ribs 49 of shell 2.

Intermediate sleeve 20 is rigid with a hydraulic cylinder 15 which is fixedly secured, as by welding, to the drive shaft 4 and therefore rotates with it, entraining the sleeve 20 and the foils 23 and 42. Cylinder 53 houses a piston 9 of re-entrant cross-section having a cup-shaped central portion 11 which protrudes axially into the annular clearance between inner sleeve 25 and shaft 4, the cross-section of cylinder 15 roughly conforming to that of the piston so as to provide a hub 12 which fits inside cup portion 11 and is rotatably journaled on a central boss 65 of housing lid 3. This configuration, disclosed and claimed in commonly owned application, Ser. No. 253,441 filed on even date herewith by Manfred Bucksch [attorney's docket No. 7776], is designed to provide a more compact assembly of reduced axial length while establishing a large effective area 53 for hydraulic pressure fluid admitted into the space 14 between the cylinder and the piston. The outer portion 10 of piston 9 carries a plurality of peripherally spaced axial projections 13 (only one shown) which exert a thrust upon the stack of foils 22, 23 when the piston is moved to the right in fluidtight contact with cylinder 15 and shaft 4 through the intermediary of annular gaskets 71, 72. Similar gaskets 66, 67 allow for the rotation of shaft 4 and cylinder 15 relative to housing boss 65.

A second piston 32, with an effective area 54 approximately equaling that of the generally flat outer portion 10 of piston 9, is slidable in a cylinder 33 rigid with outer sleeve 39. Cylinder 33 is independently rotatable, together with its piston 32, relatively to sleeves 20 and 25 by being joined by suitable fastening means (e.g. radial screws) to a tubular extension 34 which is supported on an extremity 4' of drive shaft 4 through the intermediary of another tubular member 26 constituting an extension of inner sleeve 25; member 26 has a flange 21 with peripheral teeth 55 matingly engaging between the teeth 30 of sleeve 25. These teeth 30 are cut away at 28 to form a seat for a snap ring 29 which locks the flange 21 in axially fixed position relative to sleeve 25. Tubular extensions 26 and 34 are positively connected with the two co-axial power shafts of planetary gearing 8 referred to above. Shaft 4 has an annular shoulder 18 serving as an abutment for a Belleville spring 19 which tends to maintain the piston 9 in its illustrated retracted position. Piston 32 is similarly repressed by an annular array of coil springs 37 (only one shown) bearing upon an annular flange 34' of tubular extension 34 of cylinder 33.

A third fluid cylinder 45 is defined by adjoining parts of shell 2 and lid 3; the lid is formed for this purpose with an annular shoulder 58 whose outer periphery 57 forms one of two guide surfaces for an annular piston body 44, another guide surface 56 being formed by the inner periphery of shell 2 and being in line with an edge 56' by which the shell engages a mating edge 59 of the lid. This arrangement simplifies the machining of the housing since no separate finishing operation is required for guide surface 56. Piston 44 is provided with a number of peripherally spaced projections 47 (only one shown) which, upon an advance of that piston to the right, bear on the end ring 51'' of brake 7 to compress the foils 50, 51 against their end stop 52. Hydraulic fluid can be admitted for this purpose to cylinder 45 through a port 46 in lid 3. Each projection 47 is surrounded by a coil spring 48 acting upon a flat ring 78 which is held in position, in mating engagement with lip 49, by a snap ring 79 generally similar to ring 29 coacting with ribs 30. The high-pressure fluid is delivered by a pump, not shown, through a distributor controlled by a manual selector as disclosed, for example, in the aforementioned U.S. Pat. No. 3,593,599. This selector also controls, through the same distributor, the admission of fluid to cylinders 15 and 33 so as to actuate one or more of the coupling devices 5, 6, 7 in any compatible combination. The supply branch for cylinder 33 includes an oblique conduit 36 in lid 3, a radial bore 73 in shaft 4, a central bore 36' of this shaft, another radial bore 36'' thereof, and passages 36''', 36'''' in coaxial members 26 and 34. These members are separated from each other, and from shaft 4, by narrow annular gaps defined by gasket pairs 74 and 75. Passage 36'''' opens into the space 35 between piston 32 and the back wall of cylinder 33.

The supply branch for cylinder 15 includes a generally L-shaped conduit 16 with an oblique portion similar to but angularly offset from conduit 36. Conduit 16 opens into the space between boss 65 and hub 12, between gaskets 66 and 67, the hub 12 being provided with a port 64 through which the oil can flow into the space 14 between cylinder 15 and piston 9 in any rotary position of the cylinder.

Piston 9 is provided in its outer portion 10 with a check valve 17 whose ball, urged outwardly by the centrifugal force during rotation of this piston, partly unblocks the associated orifice so as to vent the space 14 to the interior of housing 2, 3 in the absence of fluid pressure. As pressure builds up in that space, the ball obstructs the orifice and causes a rightward movement of piston 9 to actutate the clutch 5, thereby interconnecting the sleeves 20, 25 for joint rotation. A similar check valve 38 of cylinder 33 normally vents this space 35 but closes it in response to rising fluid pressure so that piston 32 moves to the left, engaging the clutch 6 with an annular array of axial projections 76 (only one shown) generally similar to the projections 13 of piston 9; this action operatively interconnects the sleeves 20 and 39.

The central bore 36' of shaft 4 is enlarged in the region of extremity 4' and is longitudinally subdivided by a plug 60 inserted into that bore, the plug being held against rotation relative to the shaft by a force fit or other means. As best seen in FIG. 3, this plug is formed with two longitudinal grooves 61, 62 of generally crescent-shaped cross-section extending along diagrammatically opposite zones thereof. Groove 61 forms part of the supply channel feeding high-pressure oil from conduit 36 to cylinder space 36; groove 62 serves for the distribution of lubricating oil from a sump 77 inside tubular member 26 to a radial bore 63 which spreads it to the various parts of the system.

The spring stop 18, held in place by a snap ring 80, may be replaced by an annular abutment of generally S-shaped cross-section as disclosed in our concurrently filed application Ser. No. 253,438 [attorney's docket No. 7778].

Upon removal of the lid 3, which for easy disassembly may be bolted onto shell 2, brake 7 can be readily extracted by sliding the split ring 78 out of the housing and thereafter disengaging the ring 79 from its recesses in ribs 49. Split rings 24, 43, 52 and 29 may be similarly disengaged to give access to parts lying behind them.

Very little machining is required in making the elements described and illustrated. Various parts such as cylinder 15 and piston 9, for example, may be manufactured by deep-drawing from sheet metal or by sinter casting. Owing to the large effective surface areas of clutch pistons 9 and 32, and in view of their approximately equal outer radii, the supply pressure of the oil fed to cylinders 15 and 33 may be quite low and may be the same for both pistons.

Planetary gearing 8 may have a construction as shown in our application, Ser. No. 253,439 of even date herewith [attorney's docket No. 7775].

We claim:

1. A multiple coupling for a planetary-gear train provided with two coaxial power shafts, comprising:
   a drive shaft;
   an inner sleeve, an intermediate sleeve and an outer sleeve spacedly and coaxially surrounding said drive shaft with freedom of independent rotation, said inner sleeve being provided with a first tubular extension joined to one of said power shafts;
   a housing rotatably supporting said drive shaft;
   first clutch means including a first set of coacting annular friction members axially slidable on said inner sleeve and said intermediate sleeve, respectively;
   second clutch means including a second set of coacting annular friction members axially slidable on said intermediate sleeve and said outer sleeve, respectively;
   brake means including a third set of coacting annular friction members axially slidable on said outer sleeve and said housing, respectively;
   a first fluid cylinder confronting said first clutch means from one side while positively connecting said intermediate sleeve with said drive shaft for joint rotation;
   a second fluid cylinder rigid with said outer sleeve confronting said second clutch means from the opposite side and having a second tubular extension joined to the other of said power shafts;
   a third fluid cylinder integral with said housing confronting said brake means;
   a first piston in said first fluid cylinder axially displaceable under fluid pressure to drive said first set of friction members against a stop remote from said first cylinder to interconnect said inner and intermediate sleeves for joint rotation;
   a second piston in said second fluid cylinder axially displaceable under fluid pressure to drive said second set of friction members against a stop remote from said second cylinder to interconnect said intermediate and outer sleeves for joint rotation;
   a third piston in said third fluid cylinder axially displaceable under fluid pressure to drive said third set of friction members against a stop remote from said third cylinder to immobilize said outer sleeve with reference to said housing; and
   conduit means for selectively admitting pressure fluid to any of said fluid cylinders.

2. A coupling as defined in claim 1 wherein said housing has an end wall proximal to said first fluid cylinder and a shell carrying part of said brake means, said third fluid cylinder being jointly defined by said end wall and said shell.

3. A coupling as defined in claim 2 wherein said end wall is provided with an annular shoulder forming an inner wall surface for said third fluid cylinder, said third piston having an annular body slidably guided on said inner wall surface and on the inner peripheral surface of said sleeve.

4. A coupling as defined in claim 2 wherein said conduit means comprises a first branch in said end wall feeding said first fluid cylinder and a second branch in said end wall extending through said drive shaft to said second fluid cylinder.

5. A coupling as defined in claim 4 wherein said drive shaft has an extremity rotatably supporting said tubular extensions, said second branch terminating in a lateral port at said extremity and communicating with the interior of said second fluid cylinder through a passage in said first tubular extension.

6. A coupling as defined in claim 5 wherein said drive shaft is provided with a central bore forming part of said second branch, further comprising an insert in said bore longitudinally partitioning same into a first channel for said pressure fluid and a second channel forming part of a lubrication circuit.

7. A coupling as defined in claim 6 wherein said insert is a nonrotatable plug with two partly overlapping longitudinal grooves constituting said first and second channels, the groove constituting said second channel opening into an oil sump located adjacent said extremity in said first extension.

8. A coupling as defined in claim 7 wherein said grooves extend along diametrically opposite zones of said plug and are of generally crescent-shaped cross-section.

9. A coupling as defined in claim 1 wherein said sleeves have crenellated peripheries forming inner and outer guide ribs and grooves for said friction members.

10. A coupling as defined in claim 9 wherein said first tubular extension has an outer peripheral flange with teeth engaging the crenellated inner peripheral surface of said inner sleeve.

11. A coupling as defined in claim 10, further comprising removable locking means for holding said flange and said inner sleeve against relative axial displacement.

12. A coupling as defined in claim 11 wherein said locking means comprises a snap ring fitting into cutouts of the ribs formed on said inner peripheral surface.

* * * * *